(No Model.)
2 Sheets—Sheet 1.
S. D. FIELD.
PRINTING TELEGRAPH.
No. 290,635.
Patented Dec. 18, 1883.
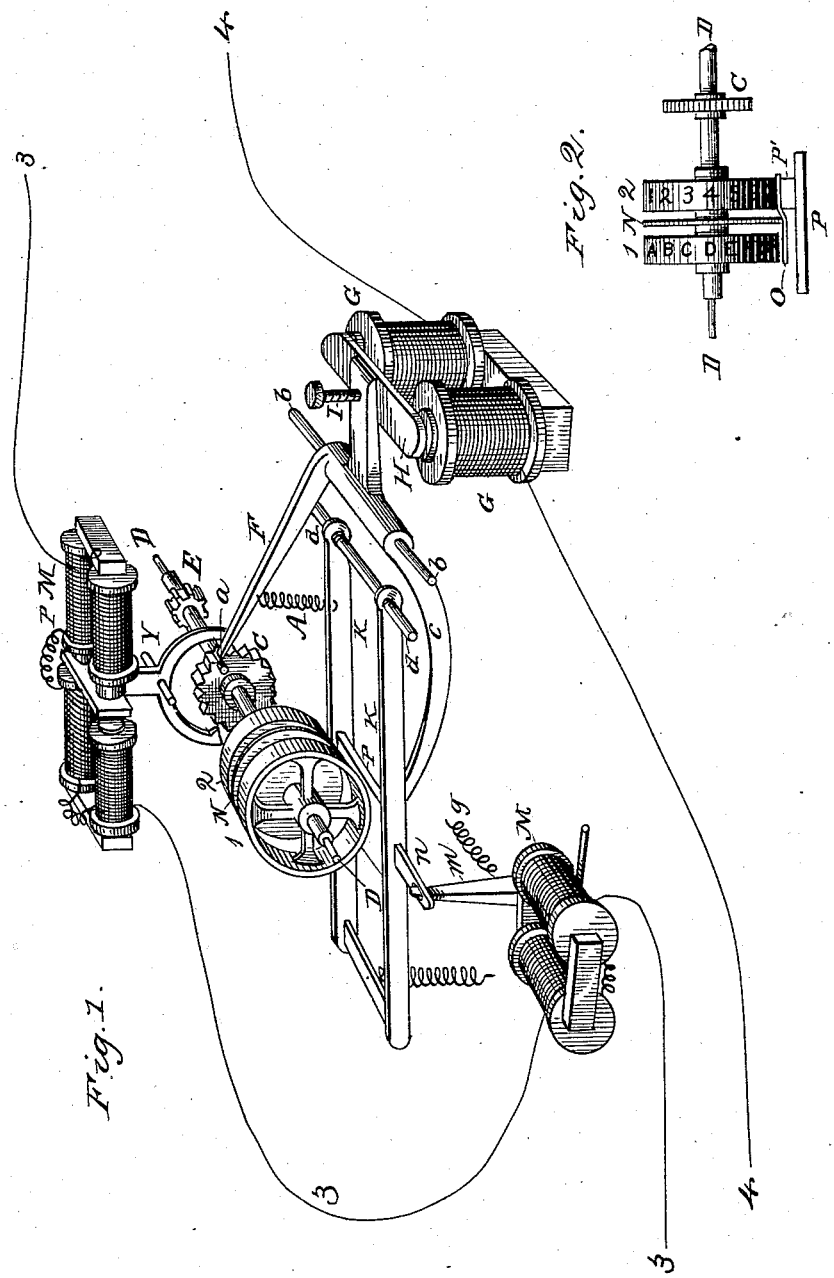
Witnesses:
J. W. Reynolds
T. F. Holden
Inventor:
Stephen D. Field
per Z. F. Weber
Atty (No Model.)
2 Sheets—Sheet 2.
S. D. FIELD.
PRINTING TELEGRAPH.
No. 290,635. Patented Dec. 18, 1883.
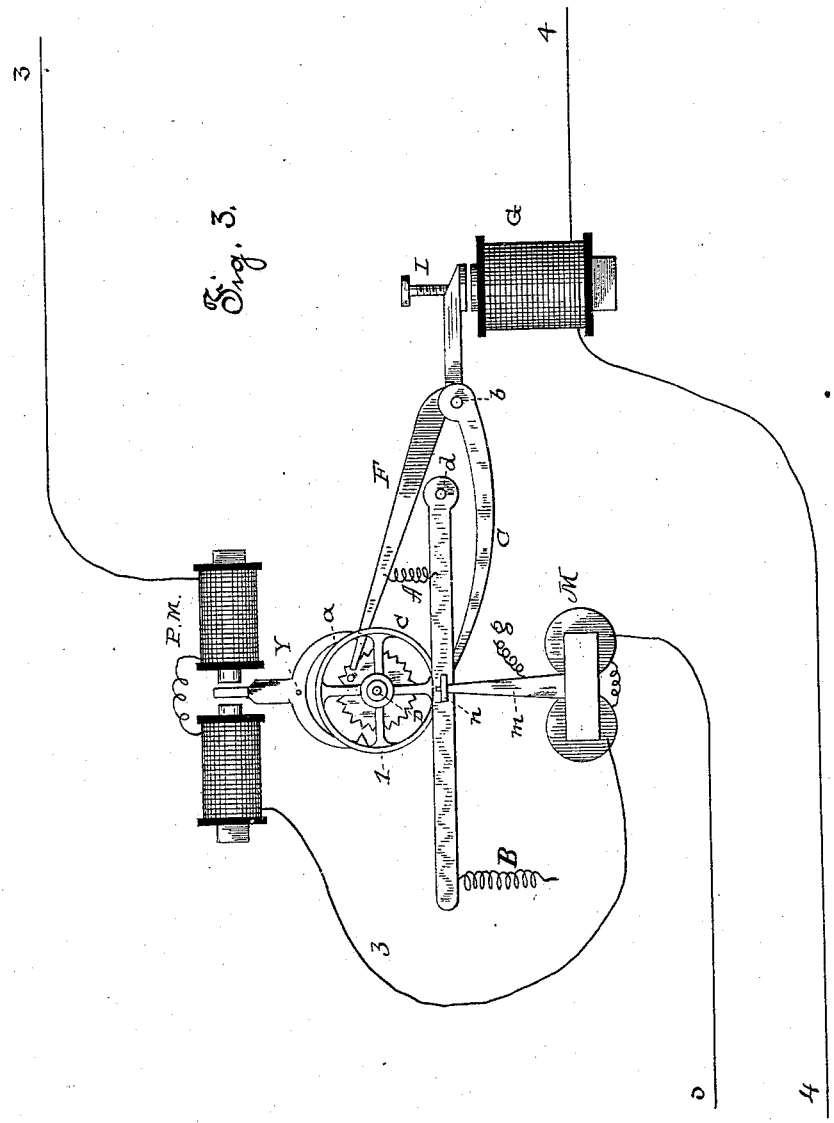
WITNESSES:
INVENTOR:
Stephen D. Field
BY Z. F. Wilber
ATTORNEY.

United States Patent Office.

STEPHEN D. FIELD, OF NEW YORK, N. Y., ASSIGNOR TO THE COMMERCIAL TELEGRAM COMPANY, OF SAME PLACE.

PRINTING-TELEGRAPH.

SPECIFICATION forming part of Letters Patent No. 290,635, dated December 18, 1883.

Application filed March 10, 1883. (No model.)

*To all whom it may concern:*

Be it known that I, STEPHEN D. FIELD, of New York, in the county of New York and State of New York, have invented a new and useful Improvement in Printing-Telegraphs; and I do hereby declare that the following is a full and exact description of the same, reference being had to the accompanying drawings, and to the letters of reference marked thereon.

My invention relates, generally, to that class of printing-telegraphs in which two type-wheels are used, whose movement is controlled or regulated by an electro-magnetic escapement, so that they are rotated and positioned for printing from "step-by-step." It relates more particularly to means for determining in such an instrument which of the two wheels shall be printed from, and to means for preventing any false impression on the record from the wheel not desired to be printed from, and any blurring or disfiguring of the record from accidental contact of the paper with either wheel. A platen of sufficient width to take upon one only of the two type-wheels is used. This platen is mounted on a base capable of reciprocation in a platen-frame in a direction at a right angle to the plane of rotation of the type-wheels. The movement of this platen-frame toward the wheels is effected by an arm taking thereunder, and attached to or projecting from the armature-lever of the printing-magnet, while its movement away from the wheels is controlled by a suitable retractor. The reciprocating platen-base is attached to the armature-lever of an extra and neutral electro-magnet in the type-wheel circuit, so as to be reciprocated with the movements of such armature-lever. When, then, the transmitter controlling pulsations through the type-wheel circuit to position the type-wheels is stopped on a closed circuit, the armature-lever places the platen under one wheel, while when the transmitter is stopped on an open circuit the retractile spring of the armature-lever places the platen under the other wheel. In an instrument provided with these means for determining which wheel shall be printed from—and, in fact, in many two-wheel printers—there may be danger of blurring or disfiguring the record from accidental contact of the paper with either wheel, or of making a false imprint from improper positioning of the platen or wheels, or either or both dangers may arise from other causes. To guard against such dangers, what may be termed a "guard" is mounted or fastened between the two type-wheels, projecting slightly beyond their printing-planes in the direction of the approach of the platen, so as normally to prevent the paper from touching either wheel, unless, as is the case when it is desired to print, a positive force be applied to carry it around or beyond the line of the guard. This guard is made as a disk of slightly larger diameter than the type-wheels, and is rigidly mounted between them upon their shaft.

In the drawings, Figure 1 is a perspective of so much of a printing-telegraph as is necessary to show the invention. Fig. 2 is a front view of the wheels and guard. Fig. 3 is an end view of Fig. 1.

P M is a polarized magnet, whose armature ends in or is formed into a yoke, Y, taking in escapement-wheel C, mounted on shaft D, these devices forming an electro-magnetic escapement controlling the action of the motor, (not shown,) which motor connects to shaft D by pinion E. Upon D are mounted and rotate therewith the two type-wheels 1 2, each provided on its periphery with appropriate letters, figures, or symbols.

G is the printing-magnet in a circuit, 4 4, and has the armature H attached to armature-lever I, journaled at $b\ b$:

Upon or by the lever I an arm, F, is carried, to which a retractor, A, is attached, of comparatively low resistance—say ten or fifteen per cent. of the printing strength of G—tending, when H is not attracted by G, to put F in the path of a pin, $a$, on the wheel C, forming therewith a unison device. Another arm, $c$, taking underneath the platen-frame $k\ k$, and adapted to lift it when H is attracted, is carried by the lever I. The spring or retractor therefor, B, is adjusted to a comparatively high power—say eighty per cent. of the printing strength of G. The circuit 4 4 is kept normally charged to a degree sufficient to enable G to overcome the stress of A, thereby keeping the unison devices inactive, they being operated then upon an entire break in the circuit. To print, the entire current, or, rather, a full-strength current, is thrown through 4 4, when G, becoming fully charged, will attract H, overcoming the stress of B and causing the platen-frame to be lifted. In this platen-frame $k\,k$ is mounted the platen-bed P, so as to have a reciprocating motion therein, a platen, P', of about the width of a type-wheel, being mounted thereon. The reciprocation of this platen-bed is controlled by the armature-lever $m$ of the magnet M in the circuit 3 3. If the type-wheels be positioned and the circuit 3 kept closed, $m$ will be attracted by M, and will pull the platen-bed so as to place P' in position to print from 1, while if they be positioned while 3 is kept open the spring $g$ will cause $m$ to position P' for printing from 2.

Upon the shaft D, and between the wheels 1 2, is mounted the guard-disk N, of slightly larger diameter than the wheels, and arranged to project beyond the plane of their peripheries in the direction of the approach of the platen P' thereto. This guard-disk normally keeps the paper O (see Fig. 2) away from either wheel. When the act of printing takes place, the platen P' bends the paper O, or forces it by the guard-disk to the proper wheel, while the guard-disk holds it positively and clearly away from the other wheel.

The framing of the machine, paper reel and feed, inking devices, and many other details ordinarily used in printing-telegraphs are not shown or described, as their construction and relation to what is shown are well known, and their omission aids in the clearer showing of the matters of invention.

Having thus described my invention, what I claim, and desire to secure by Letters Patent, is—

1. In a printing-telegraph, the combination of a printing-magnet, a platen and platen-frame independently mounted, and an armature-lever to the printing-magnet, having two arms, one adapted to control the unison devices and one adapted to control the independently-mounted platen-frame and platen, substantially as set forth.

2. The combination, in a two-wheel printing-telegraph, with the two type-wheels and the platen for causing an impression therefrom, of a guard-disk mounted between the type-wheels and rotating with them, substantially as set forth.

This specification signed and witnessed this 1st day of March, 1883.

STEPHEN D. FIELD.

Witnesses:
 LUTHER G. SHINN,
 GEO. W. CASPER.